Sept. 22, 1931.  S. A. FORTER  1,824,474
MAKING SHEET GLASS
Filed March 28, 1927  4 Sheets-Sheet 2
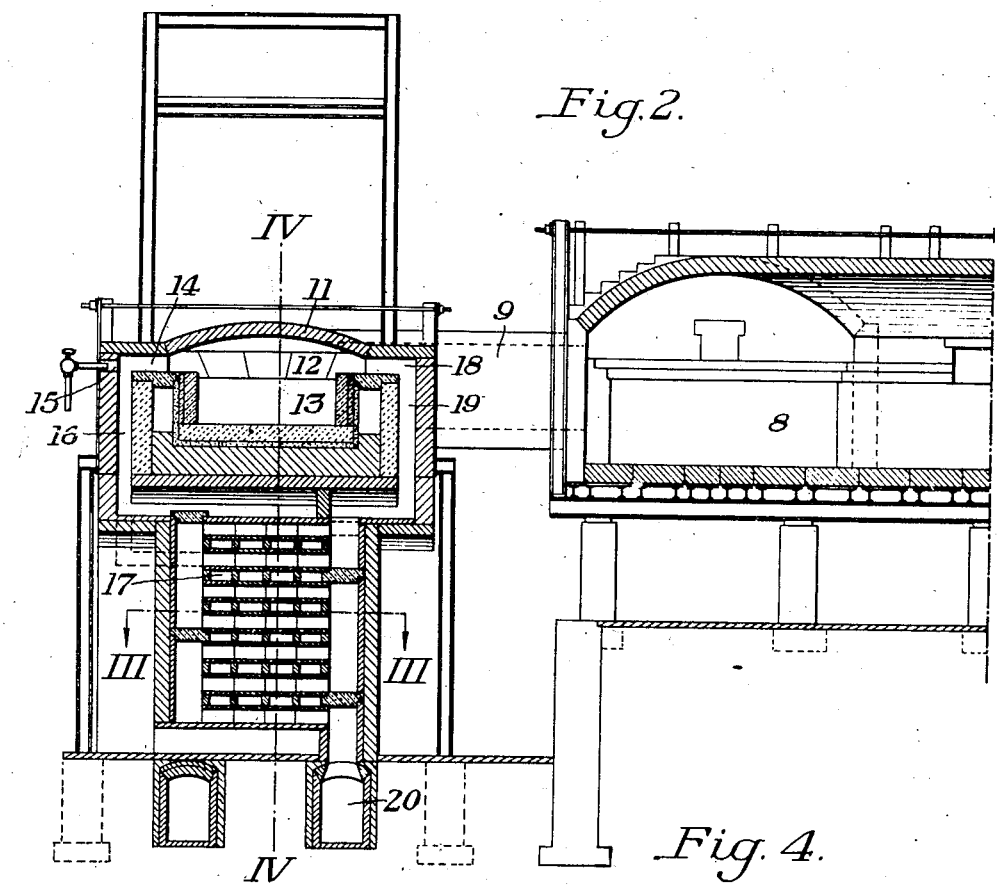
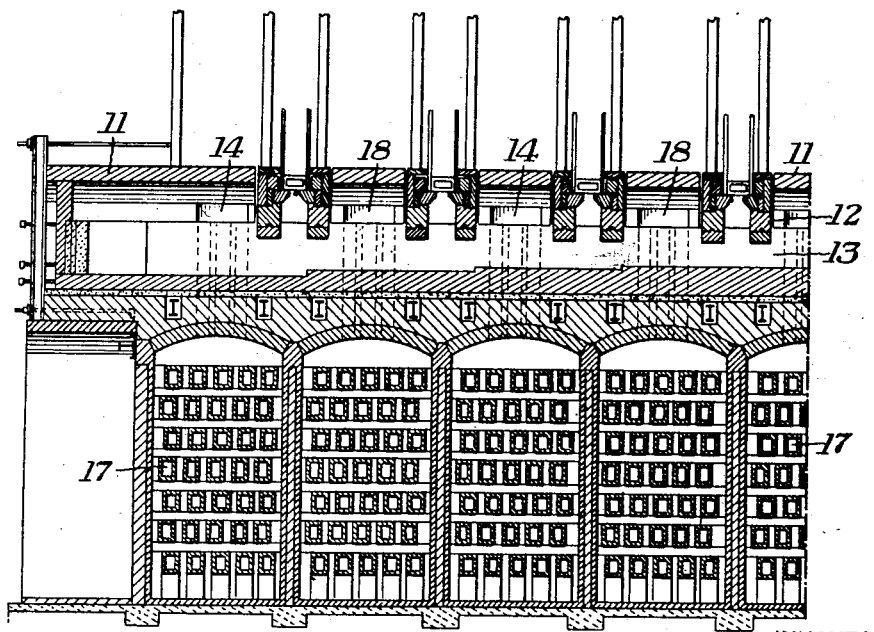
INVENTOR Sept. 22, 1931. S. A. FORTER 1,824,474
MAKING SHEET GLASS
Filed March 28, 1927 4 Sheets-Sheet 3

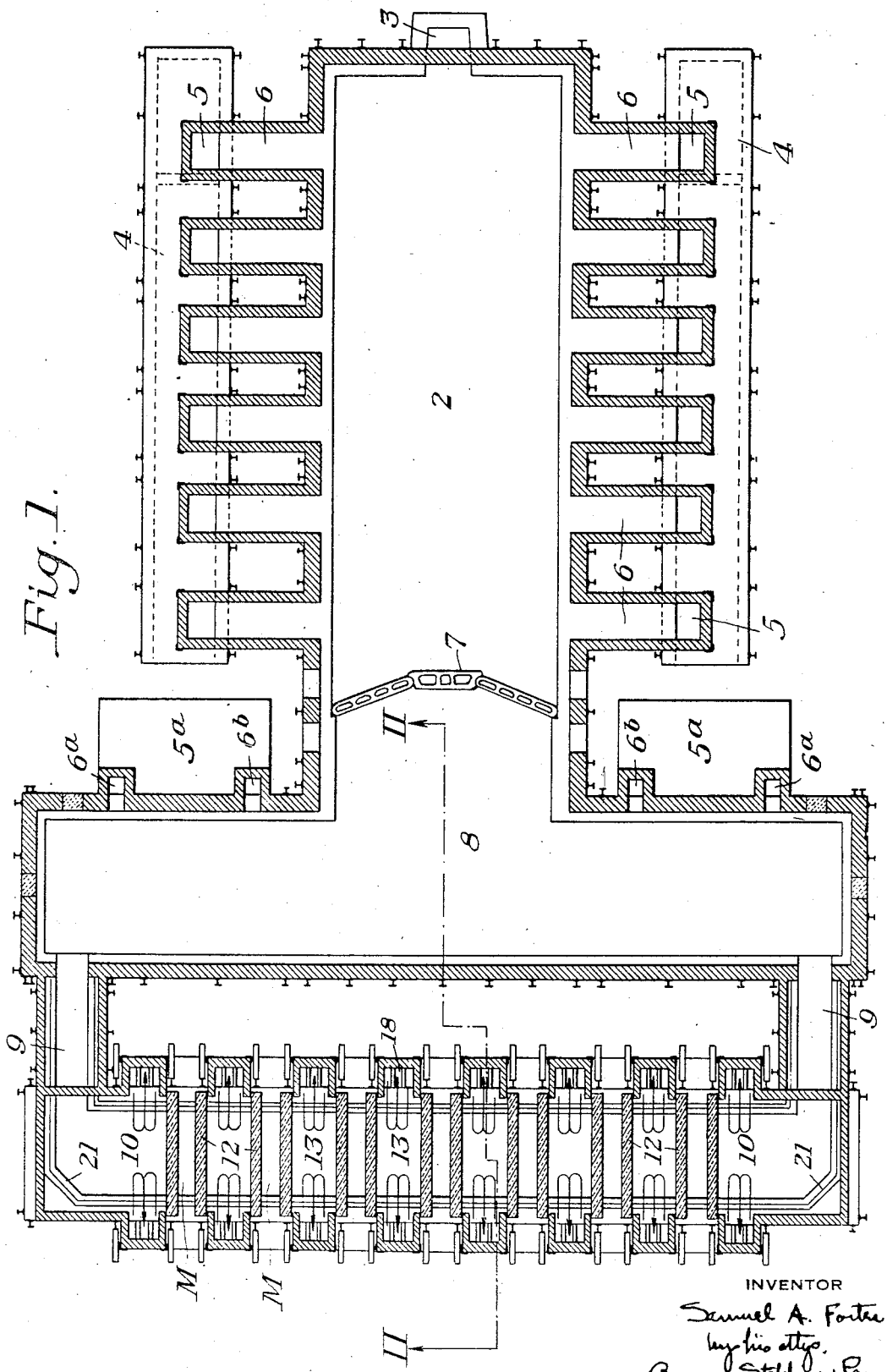

INVENTOR

Sept. 22, 1931.  S. A. FORTER  1,824,474
MAKING SHEET GLASS
Filed March 28, 1927  4 Sheets-Sheet 4

INVENTOR
Samuel A. Forter
by his attys.
Byrnes, Stebbins & Parmelee

Patented Sept. 22, 1931

1,824,474

UNITED STATES PATENT OFFICE

SAMUEL A. FORTER, OF BELLEVUE, PENNSYLVANIA, ASSIGNOR TO H. L. DIXON COMPANY, OF PITTSBURGH, PENNSYLVANIA, A CORPORATION OF PENNSYLVANIA

MAKING SHEET GLASS

Application filed March 28, 1927. Serial No. 178,876.

This invention relates to the manufacture of sheet glass and is particularly illustrated and described herein as applied to the Fourcault process of manufacture.

In the Fourcault process, a slotted clay floater or "debiteuse" is depressed in a bath of molten glass to such an extent that the glass wells up through the slot. It is engaged by a bait to start a draw, and thereafter it is drawn upwardly in continuous sheet form. This process is advantageous in that a number of machines may be connected to one melting tank. Difficulty, however, has been experienced in so positioning the machines that the glass produced by all of them is up to the desired quality.

A Fourcault unit as ordinarily constructed comprises a continuous melting tank having a neck at one end. The neck is connected to a long "drawing chamber" lying at substantially right angles to the melting tank, so that the tank and the drawing chamber, taken together, are roughly in the form of a T. Considering that portion of the drawing chamber which lies to one side of the center line, it will be seen that it is, in effect, a channel open to receive molten glass from the tank at one end, but entirely closed off at the other end. Each debiteuse extends across the drawing chamber. Assuming an ordinary installation, with one machine at the center of the drawing chamber, and three lying to either side, it will be seen that the center machine, and possibly the adjacent machines, will receive glass fresh from the melting tank, while the other machines must draw glass from under the debiteuse of one or more machines lying between the machine in question and the neck through which glass flows from the tank. Since a debiteuse requires a drawing chamber of considerable depth it is common practice to make the drawing chamber of uniform cross section throughout its length, and it follows that the glass flows from the center line to the end portions of the drawing chamber at decreasing velocity. There is a quiescent pool, with no determinate flow, between the debiteuse of an end machine and the end wall proper.

These conditions are bad because they are conductive to devitrification, with a consequent lowering in the quality of the glass. It is common knowledge that the highest quality glass produced in a Fourcault unit is produced on the center machine, and that the quality produced on the other machines drops steadily as we go from the center to the ends of the drawing chamber. It has been attempted, after a crude fashion, to overcome this difficulty by ladling glass from the quiescent pools at the ends of the drawing chamber, but such operation is expensive and generally unsatisfactory. Moreover, it is generally carried out at intervals and therefore is not uniform in its effect.

I provide for maintaining a substantially continuous flow of glass on each side of every machine in the unit. I preferably do this by departing entirely from the conventional method of supplying glass at the center of the drawing chamber, and, instead, provide two spaced apart supply channels having a drawing chamber therebetween. The two channels may be connected to one tank or to separate tanks as desired. Provision is made for securing a smooth flow of glass from the source to the drawing chamber so as to do away with the "pocketing" and consequent devitrification of the glass as it travels to the machines. Provision is also made for more uniformly heating the chambers between adjacent machines.

In the accompanying drawings, which illustrate the present preferred embodiment of the invention as applied to the Fourcault process:

Figure 1 is a horizontal section through a melting furnace and drawing chamber embodying the invention;

Figure 2 is a vertical longitudinal section taken on the line II—II of Figure 1;

Figure 4 is a vertical transverse section taken on the line IV—IV of Figure 2;

Figure 5:
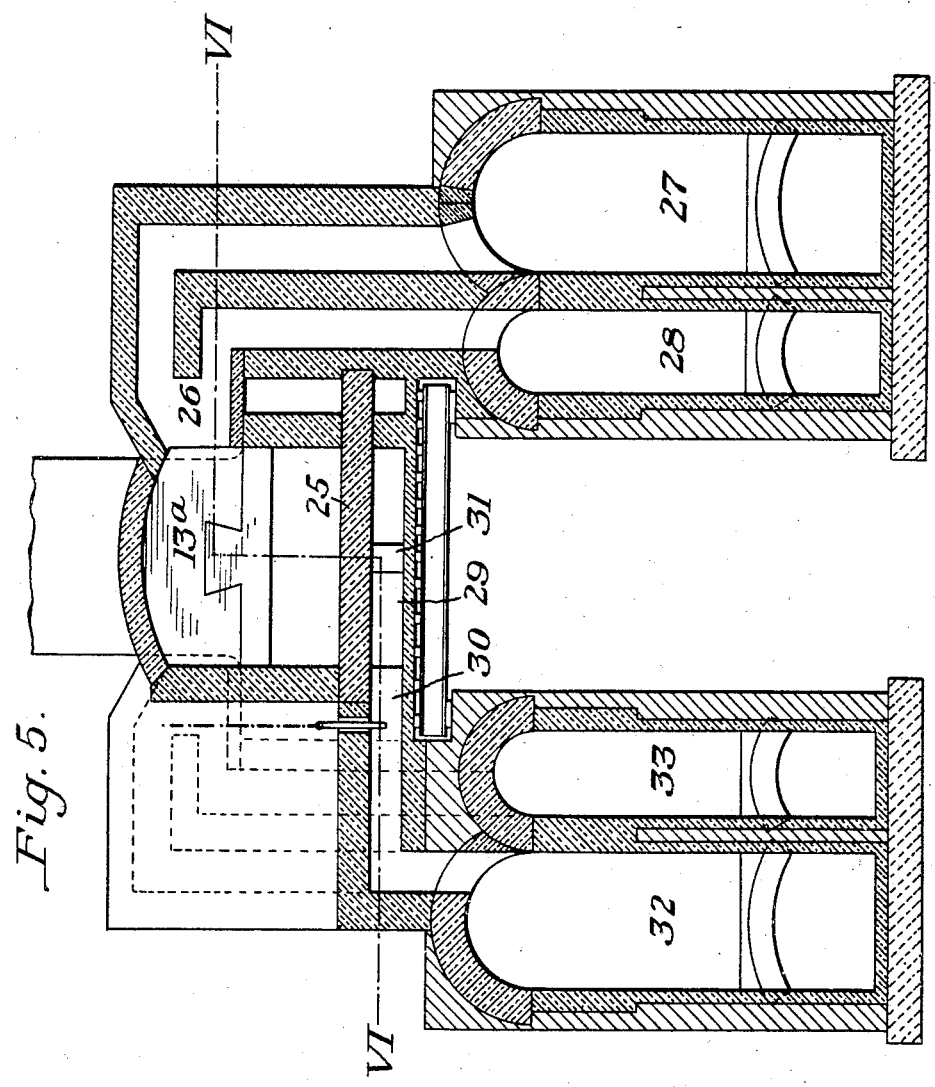
Figure 5 is a transverse vertical section through a modified form of drawing chamber.
Figure 3:
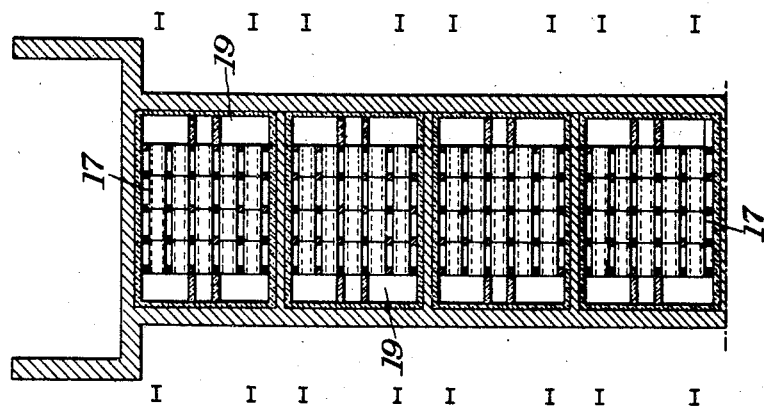
Figure 3 is a horizontal section taken on the line III—III of Figure 2.

In the drawings, there is shown a melting furnace 2 having the usual doghouse inlet 3 for batch material. The furnace is of the regenerative type, having regenerators 4 connected through uptakes 5 to ports 6. The glass is melted and passes under a floater 7 to a chamber 8. The chamber 8 is materially wider than the main portion of the tank 2. It serves to carry the glass to spaced apart channels 9 communicating with the drawing chamber 10, and also acts as a fining chamber for the glass. It is heated by radiation and also by combustion gases from ports $6^a$ connected to recuperators $5^a$. The offtake flue for each recuperator is shown at $6^b$.

The channels 9 lead from the ends of the chamber 8 to the ends of a drawing chamber 10. The drawing chamber is arranged to accommodate seven machines, the position of the debiteuse for each machine being indicated at M in Figure 1. It will be seen that there are no end pockets where glass may lie undisturbed and set up devitrification, but that on the contrary there will be a condition of regular flow on each side of the line of generation for each machine.

An arch 11 is provided for the drawing chamber 10, this arch being interrupted above each debiteuse to permit of drawing the sheet upwardly. Shades 12 are provided alongside each debiteuse and the sheet chamber 13 thus formed between adjacent machines is heated. Each chamber 13 is provided at each sheet corner with a port 14 having a burner opening 15 and connected through an uptake 16 to a recuperator 17. Between each pair of ports 14 there is provided an outlet port 18 connected through a passage 19 to the recuperator 17 and thence to a stack connection 20. The general path of the heating gases is indicated by arrows in Figure 1. By regulating the different burners at the openings 15 the heating of the chambers may be kept very uniform.

The glass in flowing from the melting tank to the machines passes through substantially every portion of the apparatus. There are no pockets, and devitrification is therefore avoided. It will be noted from Figure 1 that the corners of the drawing chamber are not left sharp, but are provided with diagonal walls 21 to minimize the possibility of dead glass collecting.

Figure 6:
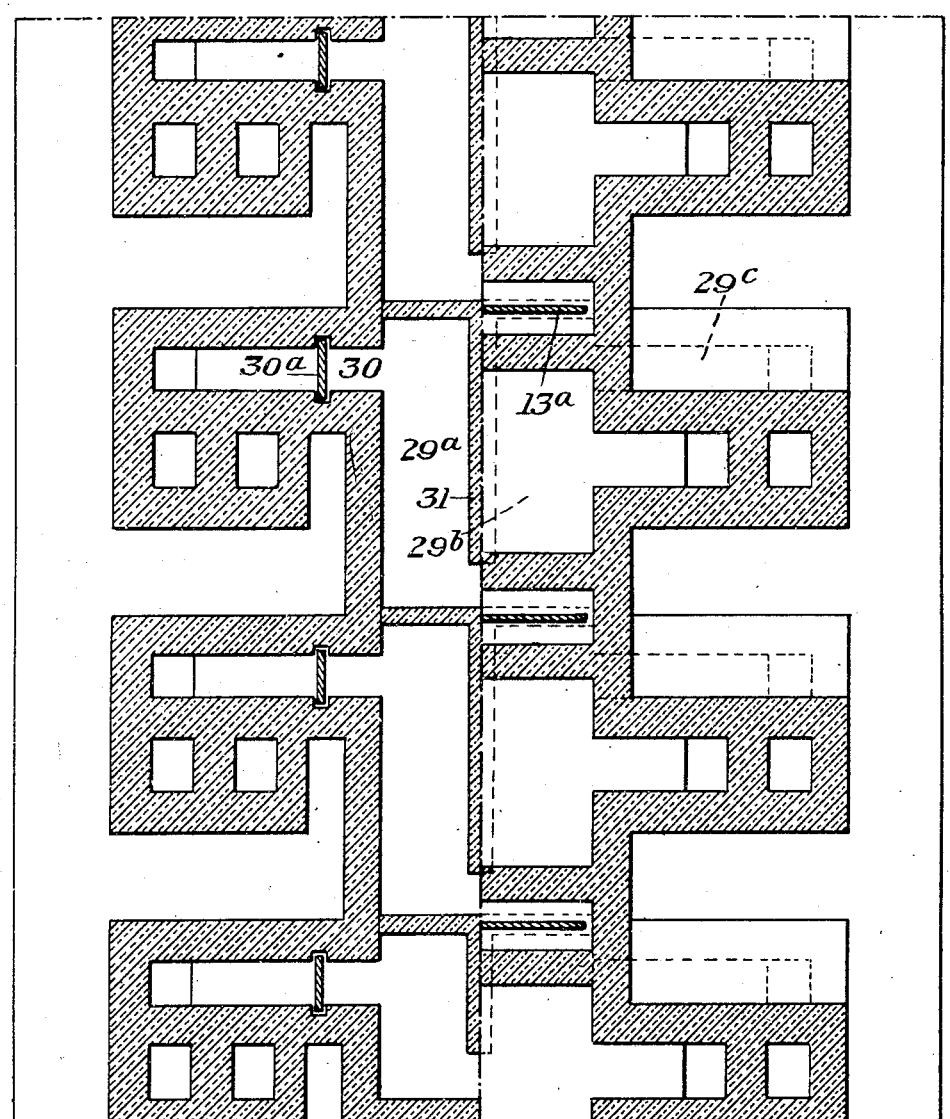
Figure 6 is a horizontal section on the line VI—VI of Figure 5.

Figures 5 and 6 show a modified form of drawing chamber wherein heat is supplied below the bottom 25. In this form of the invention the chambers $13^a$ are heated by combustion at ports 26. The ports are supplied from regenerators 27 and 28. The regenerator 27 is for air and the regenerator 28 is for gas. A muffle 29 is provided beneath the bottom 25 of the drawing chamber. Hot products of combustion are supplied through a port 30 provided with a regulating damper $30^a$, the heating gases travelling longitudinally of the drawing chamber for a short distance through the passage $29^a$ and then moving in the reverse direction through the passage $29^b$. The muffle is divided into two parts by a division wall 31 which causes the flow of heating gases above described. The waste gases are taken off through a stack connection $29^c$. The port 30 is connected to an air regenerator 32 and a gas regenerator 33. This arrangement is duplicated along the drawing chamber in the same way as are the recuperators in the embodiment of Figures 1 to 4.

I have illustrated and described a preferred embodiment of the invention, but it will be understood that it is not limited to the form shown, but may be otherwise embodied or practiced within the scope of the following claims.

I claim:—

1. Apparatus for making sheet glass including a container having at least two spaced machines with a chamber therebetween, at least one side of the chamber having a pair of inlet ports for heating gases and having an outlet port therebetween.

2. In a sheet drawing apparatus, a drawing chamber divided into a plurality of sheet chambers, inlet ports for heating gases at both ends of the sheet chambers and an outlet port therebetween.

In testimony whereof I have hereunto set my hand.

SAMUEL A. FORTER.

CERTIFICATE OF CORRECTION.

Patent No. 1,824,474.                                        Granted September 22, 1931, to

SAMUEL A. FORTER.

It is hereby certified that error appears in the printed specification of the above numbered patent requiring correction as follows: Page 2, line 33, strike out the word "sheet" and insert the same to follow the word "Each" in line 32; and that the said Letters Patent should be read with this correction therein that the same may conform to the record of the case in the Patent Office.

Signed and sealed this 17th day of November, A. D. 1931.

(Seal)                                                              M. J. Moore,
                                                                 Acting Commissioner of Patents.